J. PITCHER.
Flood Fence.
No. 68,232.
Patented Aug. 27, 1867.
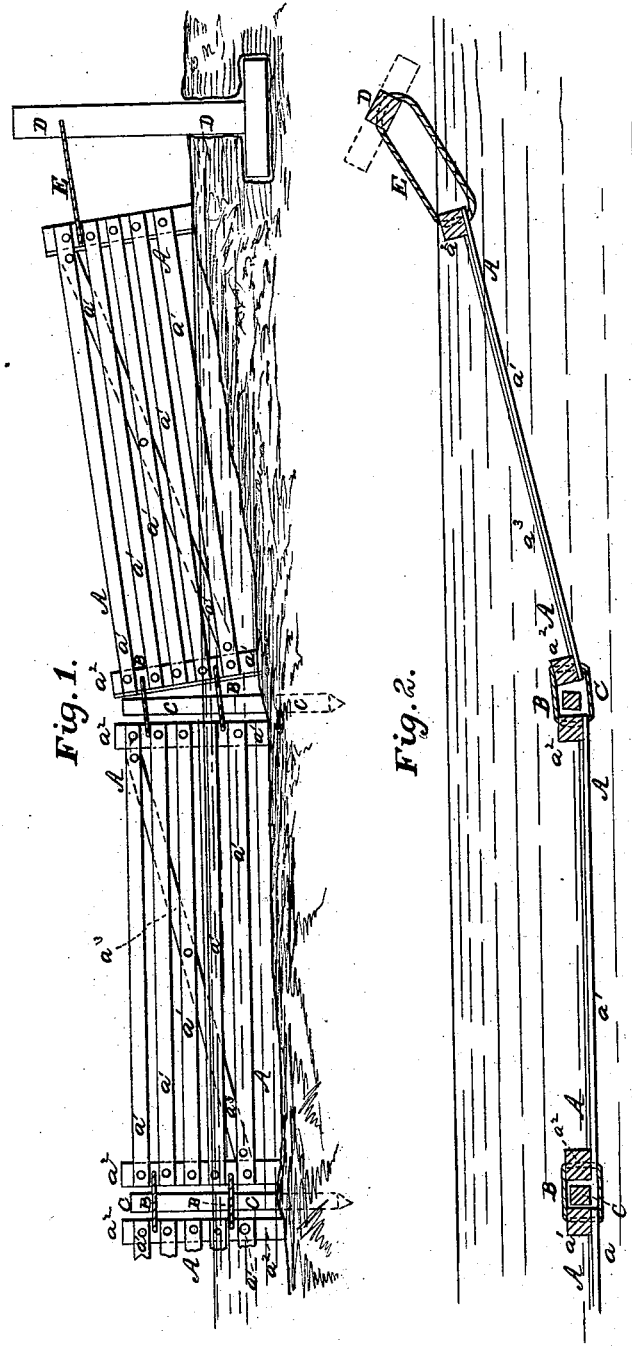

United States Patent Office.

JOHN PITCHER, OF MOUNT VERNON, INDIANA.

Letters Patent No. 68,232, dated August 27, 1867.

IMPROVEMENT IN FLOATING FENCE.

*The Schedule referred to in these Letters Patent and making part of the same.*

---

TO ALL WHOM IT MAY CONCERN:

Be it known that I, JOHN PITCHER, of Mount Vernon, in the county of Posey, and State of Indiana, have invented a new and improved Floating Flexible Fence; and I do hereby declare that the following is a full, clear, and exact description thereof, which will enable others skilled in the art to make and use the same, reference being had to the accompanying drawings, forming part of this specification, in which—

Figure 1 is a side view of a portion of my improved fence.
Figure 2 is a horizontal section of the same.
Similar letters of reference indicate like parts.

My invention has for its object to furnish an improved floating fence, so constructed and arranged that it will adjust itself to the varying depth of the water, and which shall be so flexible as to yield and not offer a rigid resistance to the water, while at the same time maintaining the same general position, or when afloat lying on the side; and it consists of the combination of the panels, stakes, and hoops, or their equivalent, with each other, and in the combination of the cable and anchoring-post, or its equivalent, with the end panel or panels of the fence, the whole being constructed and arranged as hereinafter more fully described.

A are the panels of the fence, which are made by attaching the horizontal bars $a^1$ to the end cross-bars $a^2$, which said cross-bars are made comparatively large and strong. The panels A are strengthened by the inclined brace $a^3$, which is secured to the panel at its middle and ends, as shown in fig. 1. The panels A are arranged in a worm, and their ends are secured to each other with hoops B, or their equivalent, passed through holes in the end cross-bars $a^2$, as shown in figs. 1 and 2. These hoops I prefer to make about the size of flour-barrel hoops. C are long stakes, which are driven into the ground within the hoops, and in the angle between the ends of the panels A, and which should be of such a length that when the water increases in depth, and the fence rises or floats higher up, it may still be kept in its proper relative position by the said stakes. In situations where the fence will be exposed to high water the ends of the end panels may be cabled to posts D, well anchored in the ground, or the cables E may be secured to live trees when practicable.

What I claim as new, and desire to secure by Letters Patent, is—

1. The combination of the panels A, hoops B, and stakes C, or their equivalent, with each other, substantially as herein shown and described, and for the purpose set forth.

2. In combination with the above, I claim the cables E and posts D, substantially as described, for the purpose specified.

JOHN PITCHER.

Witnesses:
 JAMES B. CAMPBELL,
 B. P. VAUGHAN.